(12) United States Patent
Volden et al.

(10) Patent No.: US 6,210,107 B1
(45) Date of Patent: Apr. 3, 2001

(54) BARRIER SEAL SYSTEMS

(75) Inventors: Douglas J. Volden, Park Ridge; Richard Hosanna, Morton Grove; James P. Netzel, Skokie, all of IL (US)

(73) Assignee: John Crane Inc., Morton Grove, IL (US)

(*) Notice: Subject to any disclaimer, the term of this patent is extended or adjusted under 35 U.S.C. 154(b) by 0 days.

(21) Appl. No.: 08/390,648

(22) Filed: Feb. 14, 1995

Related U.S. Application Data (60) Continuation of application No. 07/986,362, filed on Dec. 7, 1992, now abandoned, which is a division of application No. 07/491,980, filed on Mar. 12, 1990, now Pat. No. 5,249,812.

(51) Int. Cl.[7] .................................................. F01D 11/00
(52) U.S. Cl. ............................. 415/170.1; 415/174.5; 277/408
(58) Field of Search ................................... 277/400, 408; 415/170.1, 174.5

(56) References Cited

U.S. PATENT DOCUMENTS

| | | | |
|---|---|---|---|
| 2,824,759 | * | 2/1958 | Tracy . |
| 3,489,419 | * | 1/1970 | Stratienko . |
| 3,746,350 | * | 7/1973 | Mayer et al. . |
| 4,212,475 | * | 7/1980 | Sedy . |
| 4,290,611 | * | 9/1981 | Sedy . |
| 4,434,986 | | 3/1984 | Warner . |
| 4,466,619 | * | 8/1984 | Adams . |
| 4,721,311 | * | 1/1988 | Kakabaker . |
| 4,722,534 | * | 2/1988 | Wentworth . |
| 4,889,348 | * | 12/1989 | Amundson et al. . |
| 4,889,350 | * | 12/1989 | Tranter . |

FOREIGN PATENT DOCUMENTS

| | | |
|---|---|---|
| 3012711 | 10/1980 | (DE) . |
| 2950444 | 6/1981 | (DE) . |
| 8908798 | 9/1989 | (WO) . |

OTHER PUBLICATIONS

"Mechanical Seals", E. Mayer, 2nd Edition, 1972, ILIFFE Books, London GB, pp. 176–179.

* cited by examiner

*Primary Examiner*—John T. Kwon
(74) *Attorney, Agent, or Firm*—McEachran, Jambor, Keating, Bock & Kurtz (57) ABSTRACT

This invention relates to barrier seal systems for sealing the annular space between a housing and a rotating shaft which extends through a bore in the housing. The seal system has inboard and outboard mechanical end face seals. The inboard seal faces have spiral grooves for pumping a buffer fluid from a buffer chamber between the two seals toward the high pressure side of the inboard seal. The primary ring of the inboard seal may be double balanced. For high pressure applications, the buffer fluid may be pressurized and a pumping ring may be included in the outboard seal to circulate buffer fluid. High pressure applications also require two hard seal rings and optimum dam and face widths. Buffer fluid can be supplied to the seal system by a reservoir connected by a gravity feed line. A buffer fluid containment device may be attached to the high pressure side of the seal to prevent process fluid from contaminating the seal faces or secondary seals.

11 Claims, 5 Drawing Sheets fig.1.

$$\text{BALANCE} = \frac{\text{AREA}_{CLOSING}}{\text{AREA}_{OPENING}}$$

$$A_O = \pi(D^2 - d^2)/4$$

$$\text{I.D. PRESSURE } A_C = \pi(B^2 - d^2)/4$$

$$\text{O.D. PRESSURE } A_C = \pi(D^2 - b^2)/4$$

BARRIER SEAL SYSTEMS

CROSS REFERENCE TO RELATED APPLICATIONS

This is a continuation of application Ser. No. 07/986,362, filed on Dec. 7, 1992, now abandoned, which is a divisional of application Ser. No. 07/491,980 filed on Mar. 12, 1990, now U.S. Pat. No. 5,249,812.

SUMMARY OF THE INVENTION

This invention relates to barrier seal systems which are suitable for sealing a rotating shaft extending through a bore in a housing. The housing may be part of a pump, compressor or similar equipment containing a high pressure fluid. The seal system includes inboard and outboard mechanical end face seals, each having primary and mating rings. The space between the inboard and outboard seals defines a buffer chamber. A buffer fluid is supplied to the buffer chamber. The inboard seal pumps buffer fluid across the seal faces toward the high pressure side of the seal. Seals of this general nature are disclosed in Sedy, U.S. Pat. No. 4,290,611.

One of the objects of the present invention is a barrier seal system of the type described which reduces or eliminates the requirement for buffer fluid pressure, minimizes potential emissions and simplifies the buffer fluid supply equipment.

Another object of the invention is a barrier seal system in which the inboard seal is double balanced so that the inboard seal will function in the event of pressure reversals.

Another object of the invention is a barrier seal system which is operable in high pressure applications. Barrier seal systems according to the present invention which are intended for use in high pressure environments have hard primary and mating rings to resist deflection. High pressure seals also have optimum face and dam widths to maximize the pressure developed by the inboard seal.

A further object of the invention is a barrier seal system which is pressurized on the outside diameter of the inboard seal faces, thereby utilizing centrifugal force to prevent fouling of the seal faces and secondary seal.

Yet another object of the invention is a barrier seal system of the type described which includes a buffer fluid containment element forming a containment chamber on the high pressure side of the inboard seal faces. The containment chamber prevents the process fluid from contacting secondary seals or the primary and secondary ring seal faces.

Other objects may appear from time to time in the following specification, drawings and claims.

The above objects are realized by a seal system having a gland plate connected to the housing of the equipment to be sealed. A sleeve is mounted on the shaft for rotation therewith. A first static seal in the form of an O-ring is placed between the sleeve and shaft to prevent leakage along the shaft. An outboard mechanical end face seal has a mating ring connected to the gland plate and a seal head connected to the sleeve for rotation with the shaft. The seal head includes a retainer and a plurality of springs disposed between the retainer and primary ring, urging the primary ring into contact with the mating ring. A secondary seal is located between the retainer and the primary ring.

The barrier seal further includes an inboard mechanical end face seal, at least a portion of which is mounted in the annular space between the housing and the rotating shaft. The inboard seal has a primary ring and a retainer fixed to the gland plate. The retainer at least partially encloses the primary ring to fix its radial position while allowing axial movement of the primary ring. A secondary seal is disposed between the retainer and the primary ring. A mating ring of the inboard seal surrounds the sleeve and is connected thereto for rotation with the shaft. A static seal is placed between the sleeve and the mating ring to prevent leakage between them.

The mating and primary rings of the inboard seal have opposed, relatively rotating, radial seal faces on one side thereof. The outer diameters of the seal faces are exposed to the pressure of the process fluid.

The inboard seal is positioned axially of the outboard seal to define a buffer chamber. The mating ring of the inboard seal has grooves formed therein which extend from the buffer chamber partially across the mating ring seal face to a non-grooved dam portion. The grooves pump buffer fluid across the seal faces into the high pressure side of the inboard seal.

The primary ring of the inboard seal is arranged to be double balanced so that pressure reversals can be tolerated without loss of closing force. The buffer fluid may be gravity fed to the buffer chamber from a reservoir. A buffer fluid containment element spanning the inboard primary and secondary rings and in contact therewith defines a containment chamber which prevents process fluid from contacting the seal faces or the secondary seal of the inboard seal.

DETAILED DESCRIPTION OF THE INVENTION

Figure 1:
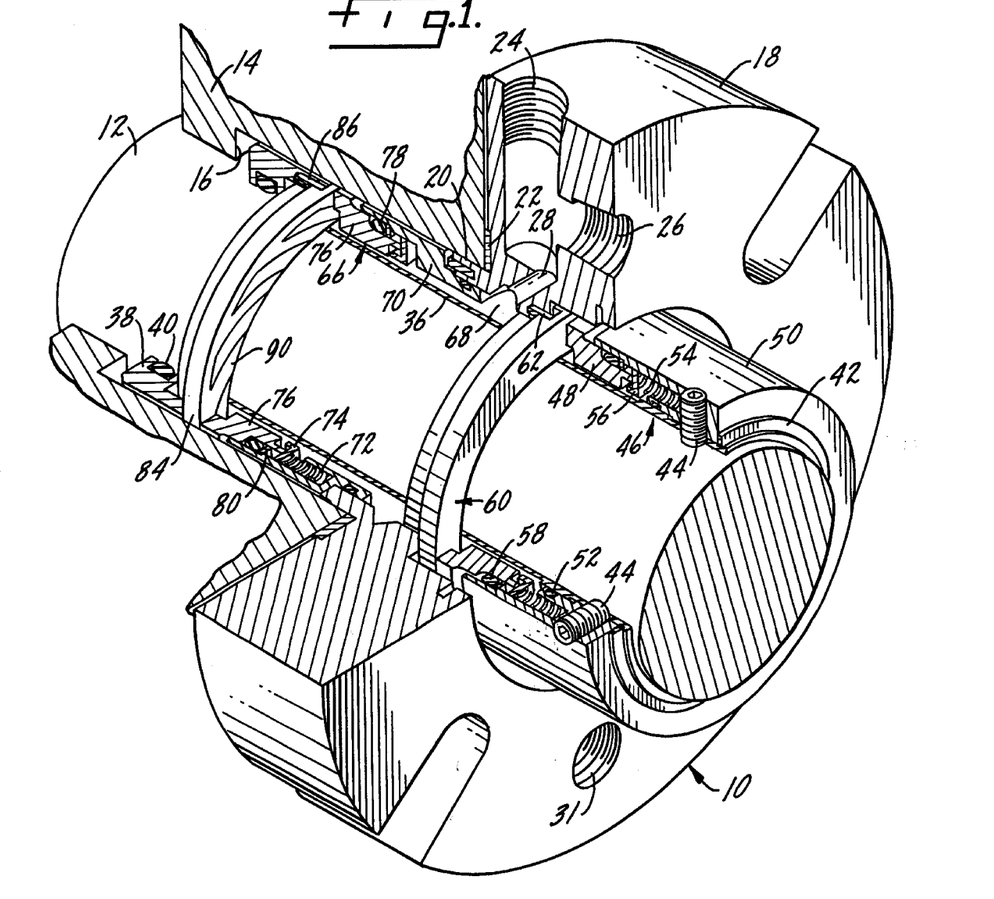
FIG. 1 is a perspective view, with portions cut away, of the barrier seal system according to the present invention.
Figure 2:
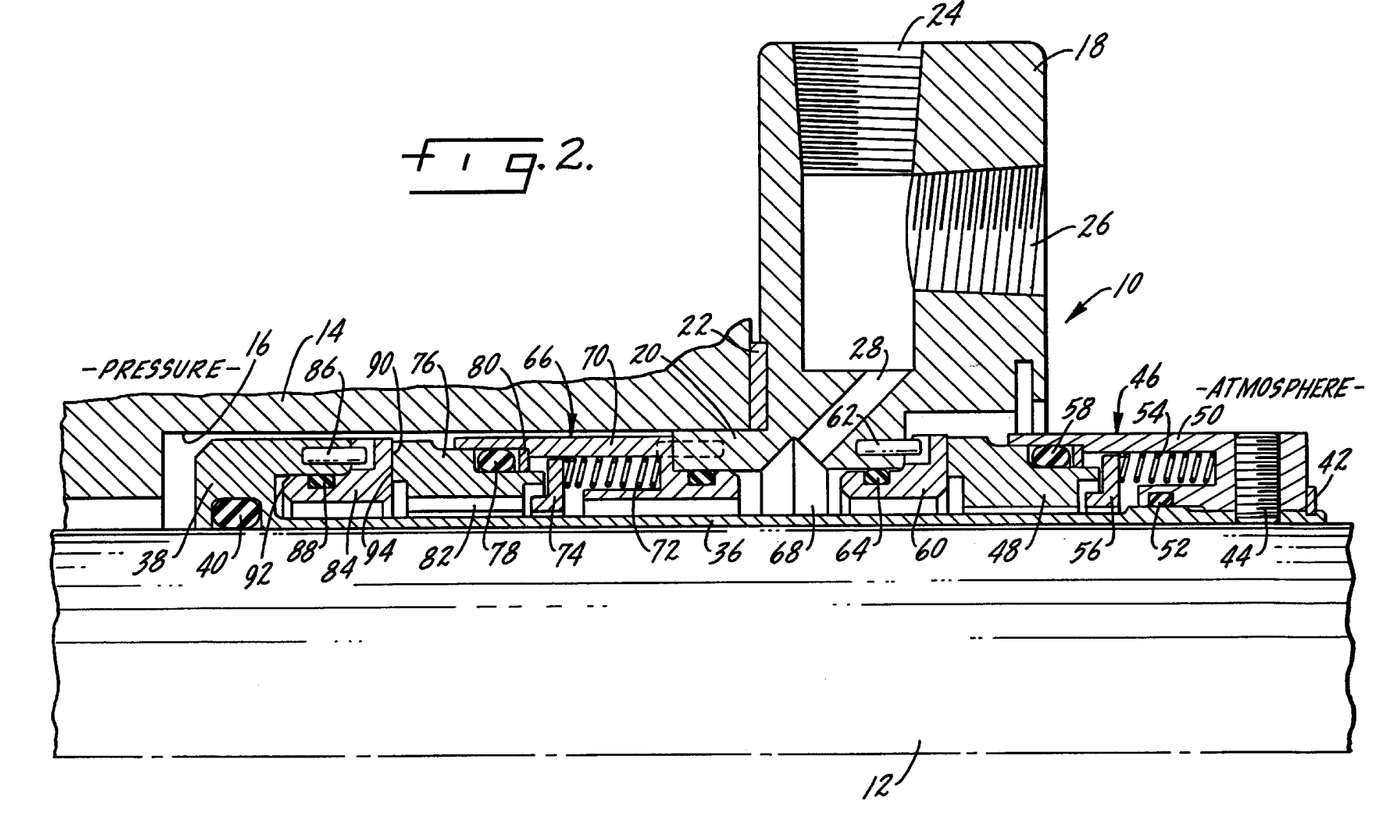
FIG. 2 is a section taken along an axial, vertical plane of the seal of FIG. 1, on an enlarged scale.

FIGS. 1 and 2 illustrate a barrier seal system 10 according to the present invention. The seal system 10 seals the annular space between a rotating shaft 12 and a housing 14. The shaft 12 extends through a bore 16 in the housing 14. The housing 14 contains a high pressure fluid on the side of the seal labeled -Pressure- in FIG. 2. The exterior of the seal system is labeled -Atmosphere-. The specific seal shown is intended to contain a fluid in liquid form, the liquid being under pressure.

A gland plate assembly 18 is bolted to the outer face of the housing. The gland plate has a boss 20 interfitting with the bore 16 to locate the gland plate. A gasket 22 prevents leakage between the bore 16 and gland plate 18.

The gland plate has a set of upper, vertical and horizontal taps 24 and 26, respectively. An internal passage 28 is in fluid communication with the taps 24 and 26. A buffer fluid supply line from a reservoir connects to one of the taps. The threaded taps are provided in both the vertical and horizontal orientations to accommodate the most convenient physical connection of the supply line for a particular installation. Only one of the taps will be used, the other one will be plugged. Further, looking at FIGS. 1 and 4, it can be seen that a similar lower set of vertical and horizontal taps 29, 31 is provided in the lower half of the gland plate. One of these taps is also used by a buffer fluid line connecting to the reservoir. Connections of the reservoir to the gland plate will be explained in further detail below.

The seal system 10 has an elongated sleeve 36 surrounding the shaft 12. The sleeve extends from the exterior of the gland plate to a point well inside the bore 16 where it terminates at an integral flange 38. A seat is built into the flange to retain an O-ring 40, which prevents leakage between the sleeve and the shaft. At the exterior end of the sleeve there is a groove into which a snap ring 42 fits. The sleeve is held in place on the shaft by a plurality of set screws 44.

The snap ring 42 retains an outboard seal shown generally at 46. The outboard seal is preferably a contacting mechanical end face seal. The outboard seal has a rotating seal head which includes a primary ring 48, held in place by a retainer 50. A static O-ring 52 prevents leakage between the retainer and sleeve. The seal head further includes a plurality of springs 54 engageable between the retainer and a drive ring 56. The seal head is completed by a secondary seal formed by O-ring 58.

The springs 54 urge the primary ring 48 into engagement with the face of a mating ring 60. The mating ring is stationary as it is fixed to the gland plate by a plurality of pins 62. The mating ring is sealed to the gland plate by an O-ring 64.

An inboard seal 66 is axially spaced from the outboard seal 46. The inboard and outboard seals 66 and 46, together with the sleeve 36 and gland plate 18, define a buffer chamber 68. The buffer chamber is in communication with the passage 28 in the gland plate so that buffer fluid is supplied to the buffer chamber from the reservoir.

Looking now at the details of the inboard seal 66, it has a stationary seal head including a retainer 70 which is pinned to the boss 20 of the gland plate. The retainer carries a plurality of springs 72 which urge a drive ring 74 into engagement with a primary ring 76. The drive ring has a plurality of tabs which engage depressions in the back face of the primary ring to rotationally lock the retainer and primary ring together. A secondary seal 78 is held between the retainer 70 and the primary ring 76. A disk 80 may also be positioned against a shoulder of the retainer to assist in holding the secondary seal in place against the process pressure.

The primary ring has a plurality of axial passages or grooves 82 (FIG. 2) formed at its inside diameter. The grooves 82 facilitate movement of the buffer fluid through the buffer chamber 68 to the seal faces.

The springs 72 urge the primary ring 76 into engagement with a mating ring 84. The mating ring is pinned to the flange 38 of the sleeve by pins 86. A static O-ring 88 prevents leakage between the flange 38 and the mating ring 84.

The mating ring 84 has a radial seal face 90 on one side thereof. The other side of the mating ring may be termed a back face, which, in this case, includes radial and beveled surfaces 92. Similarly, the primary ring 76 has a seal face 94 on one side and a back face on the other side which includes several radial surfaces. Details of the primary ring surfaces will be explained below.

Figure 3:
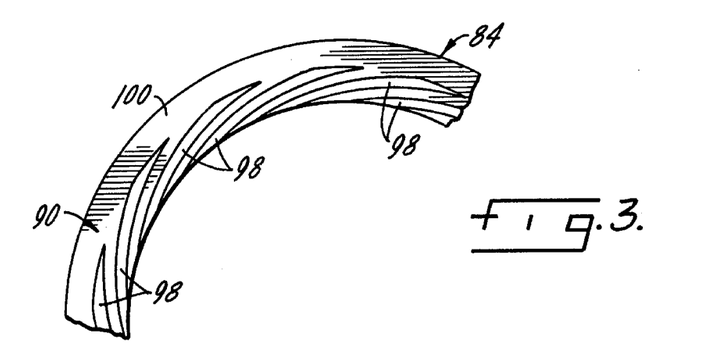
FIG. 3 is a front elevation view of a portion of a mating ring seal face, showing the spiral grooves.

Details of the mating ring's seal face are shown in FIG. 3. The mating ring face 90 has a plurality of spiral grooves 98 formed therein. The spiral grooves extend from the inside diameter of the seal face partially across the face. The ungrooved portion of the face forms a dam 100 which extends from the outside diameter of the grooved portion to the outside diameter of the mating ring. The face width is defined as half the difference between the inside and outside diameters of the face of the ring (primary or mating) having the smaller face outside diameter. The dam width is defined as the difference between the outside diameter of the primary ring and the outside diameter of the spiral grooves. For reference purposes only, the face width of the seal in FIG. 1 is 0.150 inches and the dam width is 0.050. The spiral grooves have a depth of about 180 micro-inches.

The grooves pick up buffer fluid from the buffer chamber and accelerate it against the dam 100, thereby increasing the pressure of the buffer fluid to a level greater than that of the process fluid in the housing. This prevents leakage of process fluid from the high pressure side of the seal to the buffer chamber. In fact, the rotating mating ring pumps some buffer fluid from the relatively low pressure buffer chamber to the high pressure side of the seal. This results in a small flow of buffer fluid into the process fluid.

Figure 4:
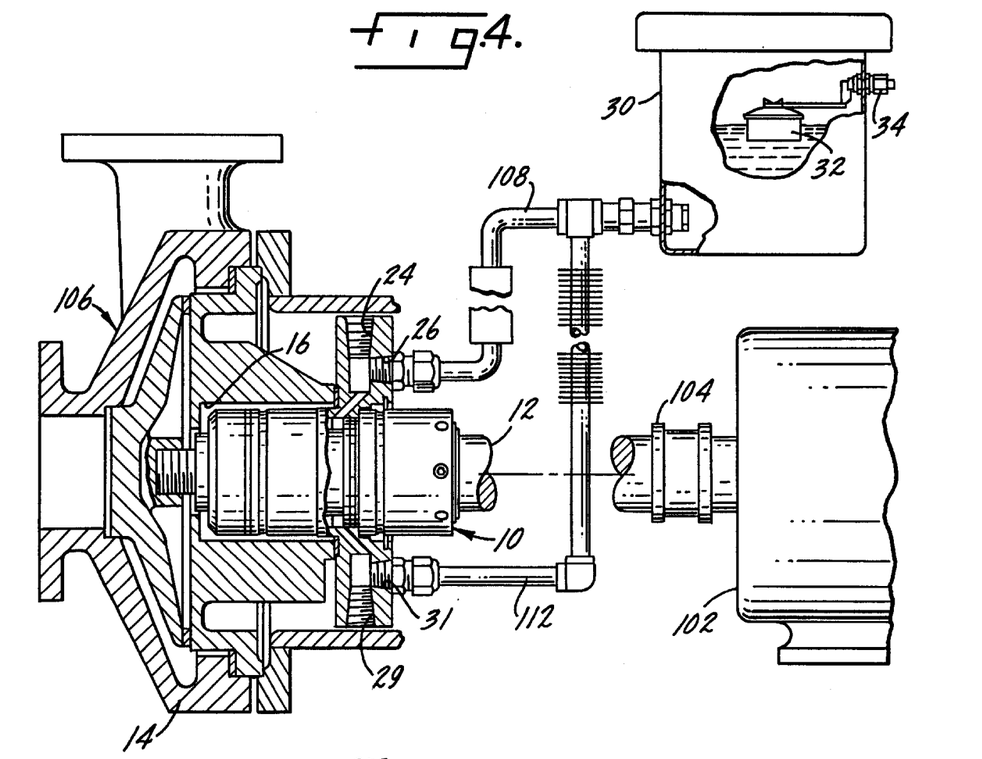
FIG. 4 is a schematic view of the barrier seal system, illustrating the buffer fluid supply arrangement.

FIG. 4 illustrates how buffer fluid is supplied to make up for the losses caused by the pumping of the inboard seal. FIG. 4 illustrates a complete apparatus in schematic form. A motor 102 engages shaft 12 through a coupling 104. The shaft drives a pump 106, which includes housing 14 and bore 16. Barrier seal system 10 is shown in place in the bore. The upper horizontal tap 26 is shown connected to the buffer fluid reservoir 30 through a pipe or tube 108. The lower horizontal tap 31 also receives buffer fluid through a pipe 112. The supply reservoir has a float 32 connected to an auto-fill valve 34. The valve 34 is connectable to a buffer fluid supply line (not shown). One of the lines 108 or 112 may be finned to facilitate heat removal, while the other may be insulated to establish a thermal siphon. The thermal siphon is an optional feature which may be used to enhance the gravity feed of buffer fluid to the buffer chamber.

Figure 5:
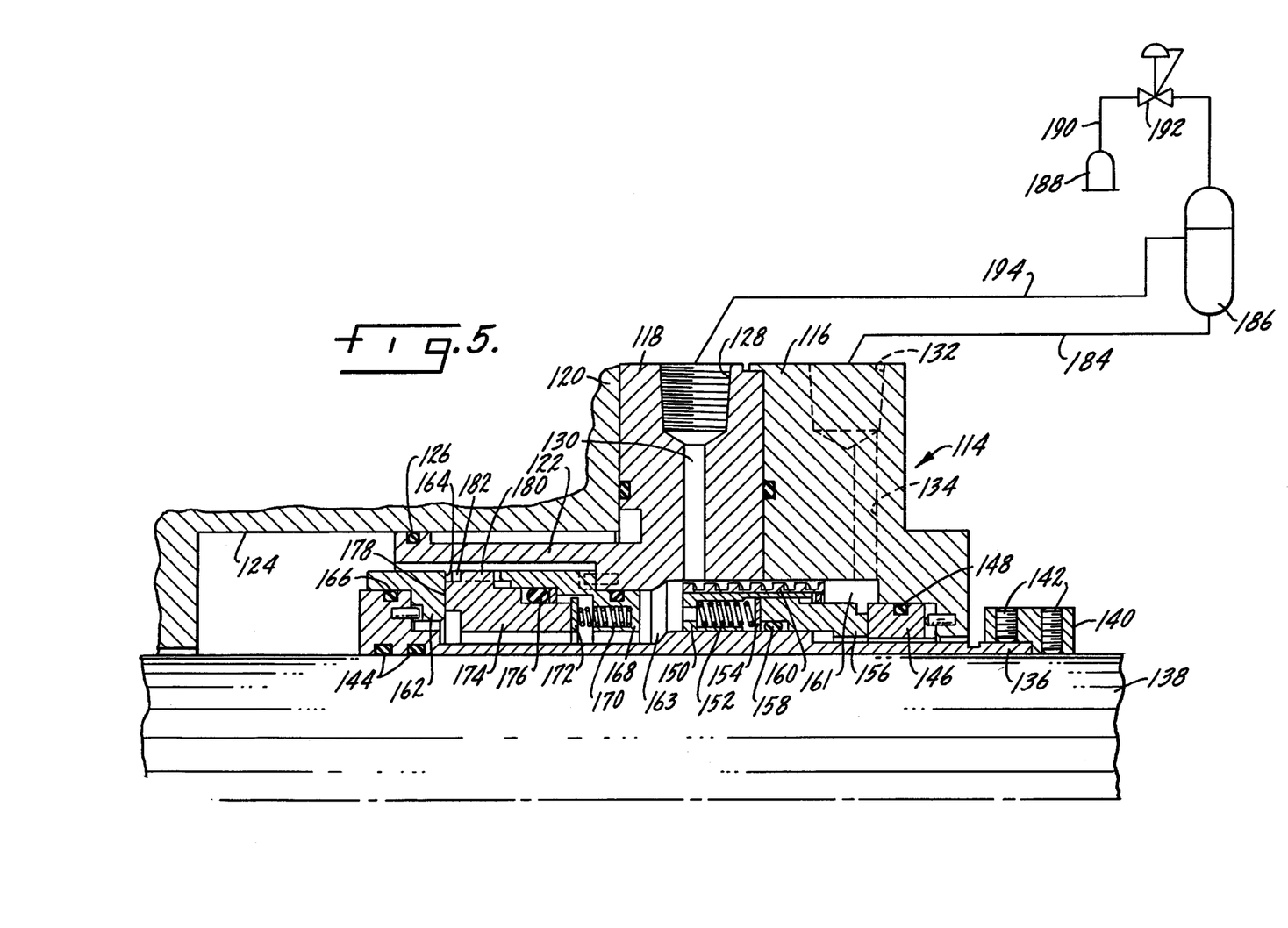
FIG. 5 is a section similar to FIG. 2 of an alternate embodiment of the invention.

Turning now to FIG. 5, an alternate form of the barrier seal system is shown generally at 114. This embodiment is intended for use in high pressure, high temperature applications. The seal system of FIG. 5 will withstand process pressures up to 1400 psi and temperatures of 700° F. In this embodiment the gland plate 116 is bolted to a liner assembly 118; these parts are bolted to the housing 120. The liner has an elongated extension 122 which extends into the bore 124 of the housing. The liner is sealed to the housing by O-ring 126. The liner also has a buffer fluid outlet tap 128 in communication with a fluid passage 130. Gland plate 116 includes a similar tap 132 and passage 134. These may actually be in the lower half of the gland plate, but are shown in phantom for convenience.

The seal system includes a sleeve 136 surrounding the shaft 138 and fastened thereto by a collar 140 held by set screws 142. O-rings 144 seal the sleeve against the shaft.

The outboard seal includes a stationary mating ring 146 pinned to an extension portion of the gland plate 116. An O-ring 148 seals the mating ring 146 against the gland plate.

The seal head includes a retainer 150 carrying springs 152 which contact a disk 154 and urge a primary ring 156 into engagement with the mating ring 146. A secondary seal 158 is held between the sleeve and primary ring. The retainer carries a pumping ring 160 which circulates buffer fluid from an outer buffer chamber 161 to an inner buffer chamber 163. These chambers are in communication with the passages 134 and 130, respectively.

The inboard seal includes a mating ring 162 which is pinned to the flange of the sleeve 136. The mating ring has a seal face 164 on one side thereof. The seal face is similar to that shown in FIG. 3. Leakage between the mating ring and sleeve is prevented by a static seal 166.

The seal head of the inboard seal includes a retainer 168 which is pinned to the liner assembly 118. Springs 170 act upon a disk 172 and the retainer 168 to urge a primary ring 174 into sealing engagement with the mating ring 162. A secondary seal 176 is disposed between the retainer and the primary ring. The primary ring has a radial seal face 178 opposite that of the mating ring. The primary ring also has an ear 180 engaging a notch 182 in the retainer.

Buffer fluid is supplied to the inlet tap 132 through a line 184, which is connected to a reservoir 186. The reservoir is pressurized by a nitrogen bottle 188 connected to the reservoir through line 190 and pressure regulator 192. Buffer fluid returns to the reservoir from outlet tap 128 through return line 194. The nitrogen bottle pressurizes the buffer fluid and, in turn, the buffer chambers 161, 163 to about 200 psi. The buffer pressure is required to urge the buffer fluid into the spiral grooves of the inboard mating ring. Even with the pressurized buffer fluid, the pressure differential between the buffer fluid and process fluid may be on the order of 1200 psi. It has been found that to increase the buffer fluid pressure this amount requires a different seal face configuration than previously used. Specifically, it has been found that where the process fluid is crude, NGL or ethane, and the buffer fluid is condensate at 200 psi and with a shaft speed of about 3550 rpm, a face width of 0.312 inches and a dam width of 0.093 inches will produce the required pressure in order to pump buffer fluid from the buffer chamber into the process fluid.

Another feature of the seal of FIG. 5 is the use of high strength materials for both the primary ring and mating ring of the inboard seal. For example, the primary ring may be made of tungsten carbide and the mating ring may be silicon carbide. Silicon carbide has a modulus of elasticity of $56 \times 10^6$ psi while that of tungsten carbide is $89 \times 10^6$. Thus, these materials will resist deflection under the process pressure. For purposes of comparison, the modulus of carbon-graphite (a commonly-used seal ring material) can range from about 1.8 to 4 or $5 \times 10^6$ psi. If low modulus materials are used for the rings, they become subject to deformation, which can distort the parallel arrangement of the seal faces. The seal faces must remain parallel to operate as intended. For purposes of this application, materials having a modulus of elasticity which is an order or magnitude greater than plain carbon will be termed high modulus materials.

It will be noted that the embodiments of both FIGS. 1 and 5 are arranged such that the process pressure is present at the outside diameters of the seal rings. This is referred to as an O.D. pressurized seal. While O.D. pressurization is shown and preferred, it will be understood that an I.D. pressurized arrangement could be used with the present invention. An advantage of O.D. pressurization is the centrifugal force generated by the rotating seal member on the process fluid tends to project the fluid away from the seal faces. This helps prevent contamination of the seal faces, particularly by particulates that may be carried in the process fluid.

Figure 6:
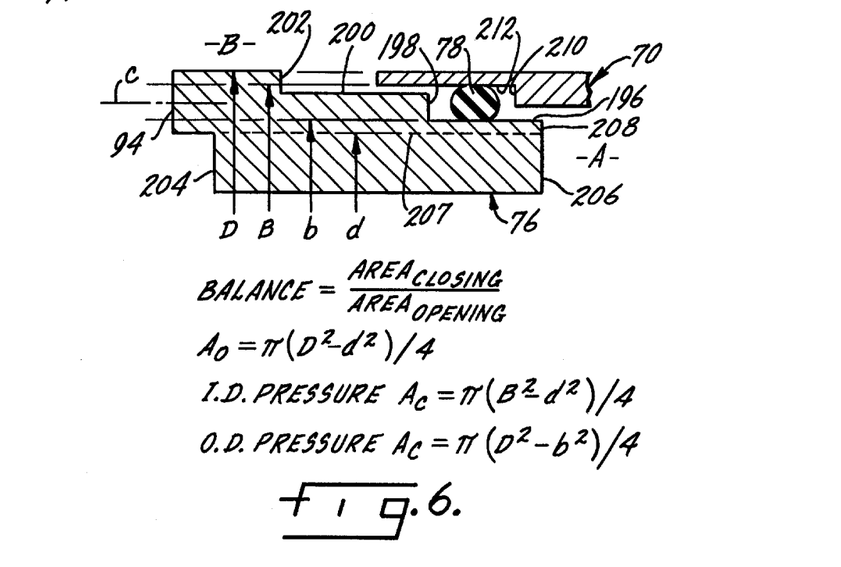
FIG. 6 is a diagrammatic detail section through a primary ring and a portion of a retainer, illustrating the double balance design of the primary ring. Cross hatching is omitted for clarity.

It has been noted above that the inboard seals in the embodiments of both FIGS. 1 and 5 are double balanced. The meaning and significance of this will be explained in conjunction with FIG. 6. Several details of the primary ring and retainer are shown in FIG. 6. The primary ring has a cylindrical seat defined by an axial ledge 196 and a radial shoulder 198. There is also a notch having surfaces 200 and 202. The notch receives the end of the retainer 70.

The front face of the primary ring includes the seal surface 94 and a front neutral surface 204. The back face of the primary ring includes shoulders 198 and 202 and a back neutral surface 206. The back neutral surface 206 is that portion of the back face which opposite the front neutral surface 204, i.e., the portion below dotted line 207. These faces are termed "neutral" because they cancel one another in the balance calculation, as will be explained. Line 207 also defines a smaller surface 208 between neutral surface 206 and the ledge 196.

The retainer 70 has a notch defined by a radial shoulder 210 and an axial surface 212.

These various components of the retainer and primary ring define a series of diameters, including an outside diameter D of the primary ring face, an internal pressurization balance diameter B, an external pressurization balance diameter b and an internal diameter of the seal face d.

Seal balance relates to the axial forces on the primary ring due to the pressure of the process fluid. These forces, together with the spring force, determine how tightly the primary ring fits against the mating ring, thereby governing the gap between them, which, in turn, is an important factor in determining overall seal performance. The process fluid pressure will act on both sides of the primary ring. Since the pressure is acting on both the front and back sides of the primary ring, the ratio of the areas of those surfaces becomes critical. The seal balance, therefore, is defined as the ratio of the area of the primary ring subject to a force which will close the primary ring against the mating ring to the area of the primary ring subject to forces which will open the gap between the primary ring and mating ring. In short, the seal balance is the area of closing divided by the area of opening.

Looking specifically at FIG. 6, a pressure gradient will act on seal face 94, tending to open the seal gap. Thus, the static area of opening is simply the seal face 94, which is $\pi(D^2-d^2)/4$.

The area of closing depends on whether the seal is externally pressurized or internally pressurized. Consider first the case of internal pressurization. The process pressure is then located in the area designated with the letter A. The full process pressure will operate on front neutral surface 204, back neutral surface 206 and surface 208. Internal pressure will also force the secondary seal 78 against the radial shoulder 198, thereby effectively operating on a surface to the limit of the axial surface 212. Forces operating on the neutral surfaces 204 and 206 operate in opposite directions and effectively cancel each other. Thus, the area of closing becomes the area between the internal pressurization balance diameter B and the internal seal face diameter d. Thus, the area of closing equals $\pi (B^2-d^2)4$. So for internal pressurization the balance equals $B^2-d^2/D^2-d^2$. This ratio is chosen to be about 0.8. Generally speaking, seals having a balance of less than one are said to be balanced, while seals having a balance greater than one are said to be unbalanced or overbalanced.

Considering the case of external pressurization or O.D. pressurization, the process pressure operates at the location indicated at B in FIG. 6. The pressure moves the O-ring 78 against the axial shoulder 210, thereby leaving the pressure to operate on faces 198 and 202. So the area of closing for external pressurization becomes $\pi(D^2-b^2)/4$. The static area of opening remains the same, namely, $\pi(D^2-d^2)/4$. So the balance for O.D. pressurization is $(D^2-b^2)/(D^2-d^2)$. This is also chosen to be about 0.8. Thus, the balance for both the internal and external pressurization is the same. This is said to be a double balanced primary ring.

It will be noted that the physical arrangement that brings about double balancing in this case is that the internal and external balance diameters B, b are symmetrical about the centerline c of the primary ring seal face 94. As a result, the area of closing for internal pressurization approximately equals the area of closing for external pressurization. Consequently, of course, the balance figures for both cases are the same and the seal is said to be double balanced. With double balancing the seal has the same balance whether the primary ring sees internal pressure or external pressure. This is important because if for some reason the internal seal stopped pumping, it could still function as a contacting seal. Also, in arrangements such as FIG. 5 where there is some buffer pressure, a double balanced seal can withstand pressure reversals. That is, ordinarily the seal of FIG. 5 expects to have O.D. pressurization from the process fluid. If, for some reason, the process fluid pressure drops below that of the buffer chamber, the seal would become internally pressurized. If the seal were not double balanced, it would blow open upon the occurrence of such a pressure reversal.

Figure 7:
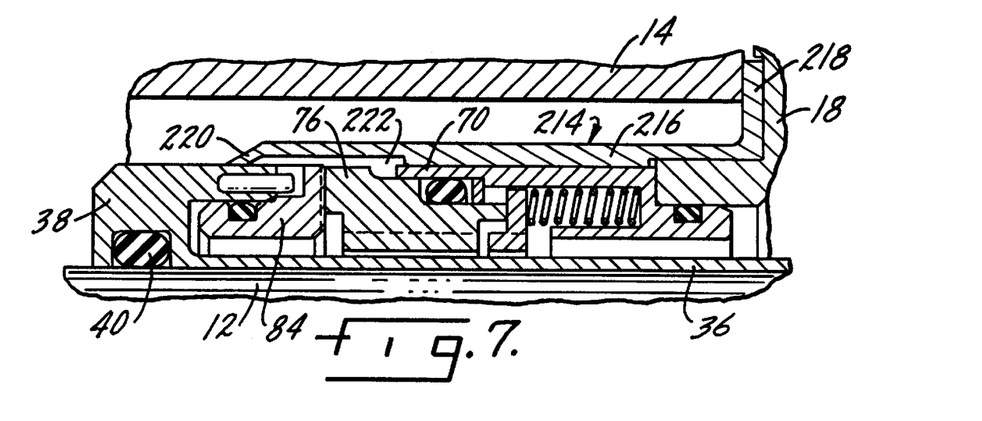
FIG. 7 is an enlarged detail view in section of a buffer containment element.
Figure 8:
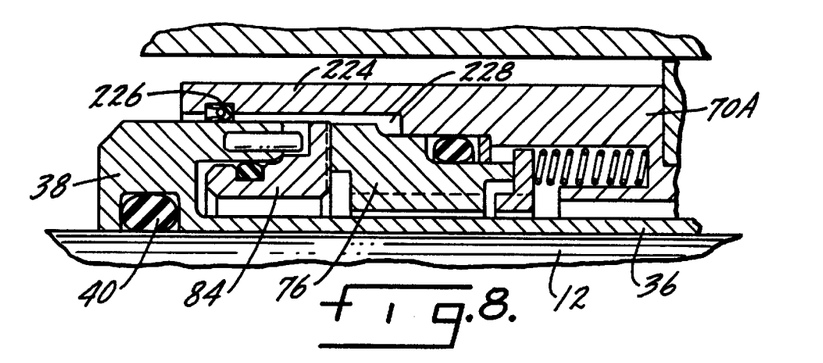
FIG. 8 is similar to FIG. 7, showing an alternate embodiment.
Figure 9:
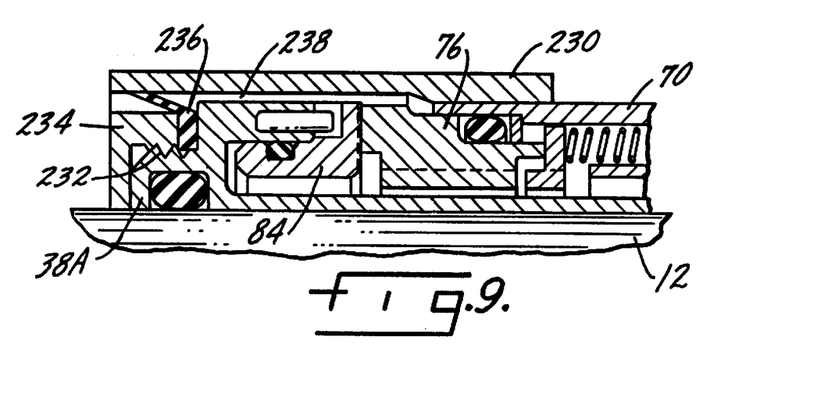
FIG. 9 is similar to FIG. 7, showing another alternate embodiment.

Turning now to another aspect of the invention, FIGS. 7–9 show three embodiments of a containment means located on the pressurized side of the seal faces and defining a containment chamber. The containment chamber retains buffer fluid pumped across the seal faces while preventing entrance of process fluid into the containment chamber. This is important because in pusher-type seals, such as in FIGS. 1 and 5, the process fluid is exposed to the secondary seal. Fluid solidifying in the O-ring area of the secondary seal may eventually restrict primary ring movement, resulting in seal leakage as the faces hang open. While an internal flush may be provided to prevent this, the equipment required to do so is expensive. It also results in flush flow in the range of 1 to 2 gallons per minute, which is added to the process fluid. In many instances, this product dilution rate is unacceptable. The containment means of FIGS. 7–9 solve these problems. In FIGS. 7–9, parts having little or no modification from the form of FIGS. 1 and 2 are given the same reference numerals.

The containment means of FIG. 7 includes an enclosure or shell shown generally at 214. The shell 214 includes a generally cylindrical body portion 216 which integrally connected to a gasket 218 at one end. The gasket 218 is trapped between the gland plate 18 and housing 14. It can replace the gasket 22 of FIG. 1. At the opposite end of the shell 214 is a lip seal 220 which is in sliding engagement with the rotating flange 38 of the sleeve. Together the shell 214, sleeve flange 38, mating ring 84, primary ring 76 and retainer 70 define a containment chamber 222. The lip seal 220 is angled so as to restrict leakage from the process fluid side of the seal into the containment chamber 222. Buffer fluid pumped across the seal faces into the containment chamber 222 is permitted to flow from the containment chamber, past the lip seal and into the high pressure side of the seal. The shell 214 is preferably made of polytetrafluoroethylene.

FIG. 8 shows an alternate embodiment wherein the containment means comprises a modified retainer 70A. The retainer has an extension portion 224 spanning the seal faces. Extension 224 has a seat which mounts a flexible seal 226. Seal 226 contacts the flange 38 of the rotating sleeve. A containment chamber is defined at 228.

A further alternate embodiment is shown in FIG. 9. It utilizes a generally cylindrical adaptor 230, which is press fit onto the retainer 70. A modified sleeve flange 38A has a threaded shoulder 232 on which a collar 234 is mounted. The collar 234 traps a lip seal 236 on the end of the flange 38A. The adaptor 230 and seal 236 define the containment chamber 238.

The containment means of any of the embodiments of FIGS. 7–9 creates a containment chamber so that a clean buffer fluid surrounds the O-ring area of the secondary seal. The containment chamber has a small enough volume so that the seal pumping rate can fill the containment chamber without requiring external filling. The lip seals function as check valves which seal product pressure while allowing buffer fluid to get past. Once the pump or other device starts operating, the Containment chamber will fill with pumpage from the seal faces. When the containment chamber pressure overcomes the process pressure and the lip seal resistance, the buffer fluid will bleed past the lip into the process. This keeps the product away from the O-ring secondary seal area and will continually lubricate the lip seal in dynamic operation. Statically, the lip seal will actuate with O.D. pressure to prevent product intrusion.

Whereas a preferred form of the invention has been shown, it will be realized that modifications may be made thereto without departing from the scope of the following claims.

What is claimed is:

1. A seal combination for sealing between a housing and a relatively rotating shaft extending through a bore in the housing, the housing defining a chamber for containing a process fluid under high pressure, said seal combination comprising:
   (a) an outboard barrier seal means at least a portion of which is mounted on said housing;
   (b) an inboard barrier seal means at least a portion of which is mounted on said housing and positioned axially of said outboard barrier seal means, said inboard and outboard barrier seal means and said housing defining a buffer fluid chamber;
   (c) pumping means carried by said inboard barrier seal means for pumping a buffer fluid from said buffer fluid chamber towards the inboard process fluid pressure side of said inboard barrier seal means in opposition to fluid leakage from the inboard barrier seal means side;
   (d) a buffer fluid reservoir located externally of said housing and in fluid communication with said buffer chamber so as to supply buffer fluid to said buffer chamber;
   (e) circulation means separate and removed from said pumping means for causing the buffer fluid to circulate from said reservoir, through said buffer chamber and to return to said reservoir; and
   (f) a means for pressurizing said buffer fluid in said reservoir separate and removed from said pumping means.

2. A pump comprising a rotatable shaft mounted in a wear end of said pump, said wear end including, a rotor, means for effecting rotation of said rotor and said shaft and a housing seal between said means for effecting rotation and said rotor, a pump means mounted on said rotatable shaft in a pump end of said pump, means for introducing a first liquid into said pump end, means for removing said first liquid from said pump end, means for introducing a second liquid into said wear end, means for removing said second liquid from said wear end, an internal pump positioned between said pump end and said wear end on said rotatable shaft, said internal pump comprising a rotatable ring connected to said shaft and having a first face contacting a second face on a stationary ring, said first face and second face having a surface configuration which effects pumping of said second liquid in said wear end to said pump end while preventing said first liquid in said pump end from entering said wear end when said shaft is rotated, said internal pump sealing said pump end from said wear end when said shaft is not rotated and means for cooling said wear end.

3. The pump of claim 2 wherein said pump means comprises an impeller mounted on said rotatable shaft.

4. The pump of claim 2 wherein said first face includes indentations.

5. The pump of claim 4 wherein said pump means comprises an impeller mounted on said rotatable shaft.

6. The pump of claim 2 wherein said second liquid is a liquid hydrocarbon.

7. The pump of claim 2 which includes an impeller on said rotor for pumping said second liquid.

8. The pump of claim 2 wherein said rotatable ring is mounted on rotatable means, said rotatable means being mounted on said shaft.

9. The pump of claim 2 wherein said rotatable ring is mounted directly on said shaft.

10. A pump comprising a rotatable shaft mounted in a wear end of said pump, said wear end including, a rotor, means for effecting rotation of said rotor and said shaft and a (housing) seal between said means for effecting rotation and said rotor, a pump means mounted on said rotatable shaft in a pump end of said pump, means for introducing a first liquid into said pump end, means for removing said first liquid from said pump end, means for introducing a second liquid into said wear end, means for removing said second liquid from said wear end, an internal pump positioned between said pump end and said wear end on said rotatable shaft, said internal pump comprising a rotatable ring connected to said shaft and having a first face contacting a second face on a stationary ring, said first face and second face having a surface configuration which effects pumping of said second liquid in said wear end to said pump end while preventing said first liquid in said pump end from entering said wear end when said shaft is rotated, said internal pump sealing said pump end from said wear end when said shaft is not rotated and means for cooling said wear end.

11. A pump comprising a rotatable shaft mounted in a wear end of said pump, said wear end including means for effecting rotation of said shaft and a seal between said means for effecting rotation and said wear end, a pump means mounted on said rotatable shaft in a pump end of said pump, means for introducing a first liquid into said pump end, means for removing said first liquid from said pump end, means for introducing a second liquid into said wear end, means for removing said second liquid from said wear end, an internal pump positioned between said pump end and said wear end on said rotatable shaft, said internal pump comprising a rotatable ring connected to said shaft and having a first face contacting a second face on a stationary ring, said first face and second face having a surface configuration which effects pumping of said second liquid in said wear end to said pump end while preventing said first liquid in said pump end from entering said wear end when said shaft is rotated, said internal pump sealing said pump end from said wear end when said shaft is not rotated and means for cooling said wear end.

* * * * *